(12) United States Patent  
Okuhira et al.

(10) Patent No.: US 9,290,638 B2
(45) Date of Patent: Mar. 22, 2016

(54) RESIN ADDITIVE, POLYPHENYLENE SULFIDE RESIN COMPOSITION, AND ELECTRONIC DEVICE

(71) Applicant: DENSO CORPORATION, Kariya, Aichi-pref. (JP)

(72) Inventors: Hiroyuki Okuhira, Kariya (JP); Akira Takakura, Nagoya (JP); Hiroshi Katou, Aichi-gun (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 79 days.

(21) Appl. No.: 14/208,101

(22) Filed: Mar. 13, 2014

(65) Prior Publication Data

US 2014/0262414 A1   Sep. 18, 2014

(30) Foreign Application Priority Data

Mar. 15, 2013   (JP) .................................. 2013-053448

(51) Int. Cl.
*C08K 5/372* (2006.01)
*C08K 5/18* (2006.01)

(52) U.S. Cl.
CPC ................. *C08K 5/3725* (2013.01); *C08K 5/18* (2013.01)

(58) Field of Classification Search
CPC ......... C08K 5/3725; C08K 5/18; C08L 81/02
See application file for complete search history.

(56) References Cited

U.S. PATENT DOCUMENTS

| | | | |
|---|---|---|---|
| 3,379,672 A * | 4/1968 | Breshears | 524/409 |
| 4,609,699 A | 9/1986 | Meyer et al. | |
| 4,748,169 A * | 5/1988 | Izutsu et al. | 524/500 |
| 5,189,103 A | 2/1993 | Abe et al. | |
| 5,336,713 A * | 8/1994 | Nagaoka et al. | 524/540 |

(Continued)

FOREIGN PATENT DOCUMENTS

| | | |
|---|---|---|
| JP | S60-115658 A | 6/1985 |
| JP | 61-183318 | 8/1986 |
| JP | H03-231945 A | 10/1991 |
| JP | 04-028764 | 1/1992 |
| JP | H04-220462 A | 8/1992 |

(Continued)

*Primary Examiner* — Michael C Miggins
(74) *Attorney, Agent, or Firm* — Harness, Dickey & Pierce, P.L.C.

(57) ABSTRACT

A resin additive for a polyphenylene sulfide includes a diamine compound expressed by a following general chemical formula (1), in which A is an oxygen atom or a sulfur atom, X is a hydrogen atom, an alkyl group with a carbon number of six or less, or an aryl group, and n is a natural number of 1 to 10. A polyphenylene sulfide resin composition includes the resin additive and a polyphenylene sulfide resin. An electronic device includes a molded product of the polyphenylene sulfide resin composition.

$$H_2N \left( \underset{X}{\overset{}{\bigcirc}} \right) A \left( \underset{X}{\overset{}{\bigcirc}} \right)_n NH_2 \quad (1)$$

16 Claims, 2 Drawing Sheets

(56) References Cited

U.S. PATENT DOCUMENTS

| | | |
|---|---|---|
| 5,587,427 A | 12/1996 | Abe et al. |
| 5,635,570 A | 6/1997 | Abe et al. |
| 6,417,311 B1 | 7/2002 | Fukuda et al. |
| 2008/0255284 A1 | 10/2008 | Ueda et al. |
| 2010/0137490 A1 | 6/2010 | Ueda et al. |
| 2011/0165342 A1 | 7/2011 | Imai et al. |
| 2014/0150973 A1 | 6/2014 | Okuhira et al. |
| 2014/0264959 A1 | 9/2014 | Okuhira et al. |

FOREIGN PATENT DOCUMENTS

| | | |
|---|---|---|
| JP | H05-032879 A | 2/1993 |
| JP | H06-207102 A | 7/1994 |
| JP | 2000-191837 A | 7/2000 |
| JP | 2007-106834 | 4/2007 |
| JP | 2008-144003 | 6/2008 |
| JP | 2010-103171 | 5/2010 |
| JP | 2011-140167 | 7/2011 |
| JP | 2014-111690 A | 6/2014 |

\* cited by examiner

RESIN ADDITIVE, POLYPHENYLENE SULFIDE RESIN COMPOSITION, AND ELECTRONIC DEVICE

CROSS REFERENCE TO RELATED APPLICATION

This application is based on Japanese Patent Application No. 2013-53448 filed on Mar. 15, 2013, the disclosure of which is incorporated herein by reference.

TECHNICAL FIELD

The present disclosure relates to a resin additive for a polyphenylene sulfide resin, a polyphenylene sulfide resin composition containing the resin additive, and an electronic device having a molded product of the polyphenylene sulfide resin composition.

BACKGROUND

A polyphenylene sulfide (PPS) resin has excellent dimensional stability, excellent mechanical strength, and an excellent heat-resisting property. The PPS resin is known as a super engineering plastic, and is widely used for housings of various kinds of electronic devices. The PPS resin is typically used for vehicular devices. However, the PPS resin does not have an adhesive functional group in the resin skeleton. Therefore, an adhesive property of a product made of the PPS resin is likely to be low. For example, in the use where the PPS resin product is used for a housing of an electronic device together with an adhesive material, such as an epoxy-based adhesive material, improvement of the adhesive property is required.

In order to improve the adhesive property of the PPS resin, for example, it was proposed to blend an epoxy-based compound to the PPS resin, as disclosed in JP2011-140167A. The adhesive property of the PPS resin can be improved by blending an adhesive modifier, such as an epoxy-based compound.

SUMMARY

When the epoxy-based compound is blended to the PPS resin, the adhesive property of the PPS resin improves. However, excellent characteristics, such as a bending property, that the PPS resin originally has are likely to be degraded. Therefore, it is desired to develop a PPS resin composition that has an excellent adhesive property and a physical property such as a bending property. Also, it is desired to develop a resin additive that can improve the adhesive property of the PPS resin without degrading the characteristics of the PPS resin, such as the bending property.

It is an object of the present disclosure to provide a resin additive that can provide a polyphenylene sulfide resin with an excellent adhesive property without degrading a bending property of the polyphenylene sulfide resin, a polyphenylene sulfide resin composition containing the resin additive, and an electronic device using the polyphenylene sulfide resin composition.

According to a first aspect of the present disclosure, a resin additive includes a diamine compound expressed by a following general chemical formula (1). Also, the resin additive is used for a polyphenylene sulfide resin.

[Chemical Formula 1]

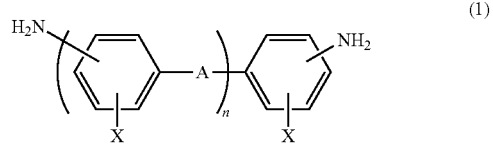

In the general chemical formula (1), A is an oxygen atom or a sulfur atom, X is a hydrogen atom, an alkyl group with a carbon number of six or less, or an aryl group, and n is a natural number of 1 to 10.

According to a second aspect of the present disclosure, a polyphenylene sulfide resin composition contains the resin additive according to the first aspect and a polyphenylene sulfide resin.

According to a third aspect of the present disclosure, an electronic device has a molded product of the polyphenylene sulfide resin composition according to the second aspect.

The resin additive according to the first aspect is made of a diamine compound expressed by the general chemical formula (1). The resin additive has, in its structure, amine that is a polar functional group. Since the resin additive described above has the amine, the resin additive can provide an excellent adhesive property to a polyphenylene sulfide (PPS) resin. Further, this resin additive described above may keep the excellent characteristic, such as the bending property, that the PPS resin originally has.

The PPS resin composition according to the second aspect contains the PPS resin and the resin additive including the diamine compound expressed by the general chemical formula (1). As the resin additive has excellent characteristic described above, a molded product provided by molding the PPS resin composition has an excellent adhesive property, and exerts the excellent characteristic of the PPS resin, such as a bending property, that the PPS resin originally has.

The electronic device according to the third aspect has the molded product of the PPS resin composition. Since the PPS resin composition contains the resin additive described above, the molded product of the PPS resin composition has excellent adhesive property for an adhesive material. For example, the electronic device can have an adhering structure in which the molded product is adhered with an adhesive material.

The resin additive described above hardly degrades the characteristic, such as the bending property, that the PPS resin originally has. Therefore, in the electronic device, the molded product of the PPS resin composition described above can exert the excellent characteristic, such as the bending property, that the PPS resin originally has.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which.

DETAILED DESCRIPTION

Figure 1:
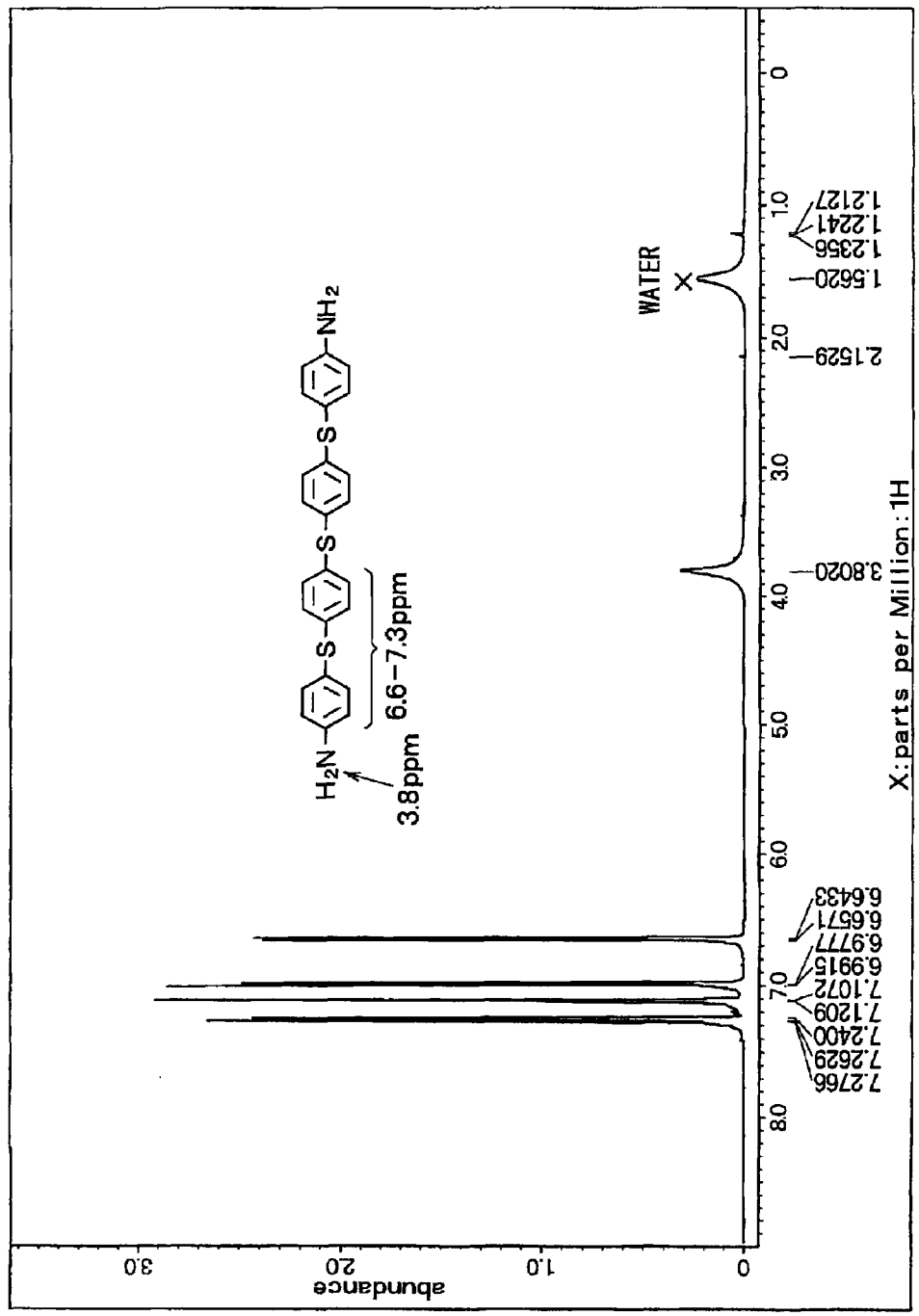
FIG. 1 is a diagram illustrating a nuclear-magnetic-resonance (NMR) spectrum of a resin additive made of phenylene sulfide skeleton diamine (n=3) of an example 1.

Hereinafter, exemplary embodiments of the present disclosure will be described.

In an embodiment, a resin additive includes or consists of a diamine compound expressed by a following general chemical formula (1).

[Chemical formula 1]

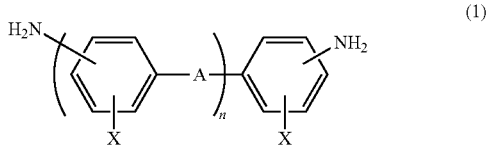

(1)

The resin additive is used by being added to a polyphenylene sulfide (PPS) resin. The amount of the resin additive added to the PPS resin may be suitably adjusted according to required specifications, such as an adhesive property or a bending property. If the amount of the resin additive added to the PPS resin is too small, there may be a possibility that improvement effect of the adhesive property is insufficient. On the other hand, if the amount of the resin additive added to the PPS resin is too much, there may be a possibility that a physical property of the PPS resin is reduced. Therefore, in the case where the resin additive is used for the PPS resin, the resin additive is preferably added to the PPS resin with the amount of 0.1 to 10 parts by mass relative to 100 parts by mass of the total of the PPS resin and the resin additive, more preferably 0.5 to 8 parts by mass, and further more preferably 1 to 5 parts by mass.

The resin additive includes the diamine compound expressed by the general chemical formula (1). In the chemical formula (1), A is an oxygen atom or a sulfur atom, X is a hydrogen atom, an alkyl group with a carbon number of six or less, or an aryl group, and n is a natural number of 1 to 10.

In the general chemical formula (1), the amino group and the X may be bonded at any positions of a benzene ring. Namely, the amino group and the X may be bonded to the benzene ring at any of an ortho position, a meta position, or a para position.

As the resin additive, one or more than two kinds of compounds expressed by the general chemical formula (1) may be used.

In an embodiment, in the general chemical formula (1), benzene skeletons are connected in a meta position or a para position through the atom A.

In this case, the steric hindrance of the resin structure of the resin additive is further reduced, and the resin additive can provide an adhesive property to the PPS resin without deteriorating a characteristic of the PPS resin, such as a bending property. In the general chemical formula (1), the benzene skeletons are preferably all connected in the para position through the atom A.

Further, in the general chemical formula (1), the amino group is preferably bonded to the benzene ring at a para position with respect to the atom A.

In an embodiment, the X of the general chemical formula (1) is a hydrogen atom or a methyl group, and preferably the hydrogen atom.

In this case, the steric hindrance of the resin structure of the resin additive is further reduced, and the resin additive can provide an adhesive property to the PPS resin without deteriorating a characteristic of the PPS resin, such as a bending property In the general chemical formula (1), if the natural number n excessively increases, it is difficult to synthesize the diamine compound. In the general chemical formula (1), therefore, the natural number n is preferably in a range from 1 to 10, more preferably in a range from 1 to 5, and further more preferably from 1 to 3. As the compound expressed by the general chemical formula (1), one selected from compounds each having the natural number of 1 to 10, or mixture of two or more compounds having different natural numbers n among the compounds in which the natural number n is 1 to 10 may be used. As the diamine compound expressed by the general chemical formula (1), a diamine compound having the natural number n of 3 (n=3) is preferably used at least.

In an embodiment, the atom A of the general chemical formula (1) is a sulfur atom.

In this case, the resin additive can provide an adhesive property to the PPS resin while further restricting the degradation of the characteristic, such as the bending property, of the PPS resin.

In an embodiment, a polyphenylene sulfide resin composition contains a resin additive and a polyphenylene sulfide resin.

In the polyphenylene sulfide resin composition, it is preferable that the content of the resin additive is 0.1 to 10 parts by mass with respect to 100 parts by mass of the total of the resin additive and the polyphenylene sulfide resin.

In this case, an adhesive property of an adhesive material relative to the PPS resin can be improved while further restricting the degradation of the characteristic, such as the bending property, that the PPS resin originally has. The content of the resin additive is more preferably 0.5 to 8 parts by mass, and is further more preferably 1 to 5 parts by mass.

In an embodiment, an electronic device has a molded product provided by molding the polyphenylene sulfide resin composition. Examples of the electronic device are various sensors, such as a pressure sensor for a vehicle. The molded product of the polyphenylene sulfide resin composition is, for example, used for a housing or the like of the electronic device.

In an embodiment, the molded product of the polyphenylene sulfide resin composition is used for a housing that accommodates an electronic component of an electronic device, and the housing is bonded using an adhesive material.

In such a case, the molded product of the PPS resin composition can exert the function of excellent adhesive property with the adhesive material. Namely, in the electronic device, the molded product can be bonded with the adhesive material with a high bonding strength. The molded product has an excellent bending property. Therefore, in the electronic device employing the molded product, the molded product can hermetically seal the electronic component therein and exert excellent strength to an external shock.

In an embodiment, the adhesive material of the electronic device is an epoxy-based adhesive material.

In such a case, the adhesive property of the molded product of the polyphenylene sulfide resin composition with the adhesive material can be further improved.

It is to be noted that the exemplary embodiments of the resin additive and the polyphenylene sulfide resin composition described above may be combined in any various ways if there is no problem nor inconsistency.

EXAMPLES

Examples 1 to 4 of the resin additive described above and the polyphenylene sulfide resin composition described above, and comparative examples 1 and 2 will be described hereinafter. Also, an example of an electronic device will be described, as an example 5.

Example 1

An example 1 of the resin additive and the polyphenylene sulfide resin composition will be described hereinafter.

In the example 1, a diamine compound expressed by the following chemical formula (2) was produced, and a polyphenylene sulfide resin composition was produced using the diamine compound produced. Further, a molded product of the polyphenylene sulfide resin composition was prepared, and an adhesive property of the molded product with an adhesive material and a bending property of the molded product were evaluated.

[Chemical formula 2]

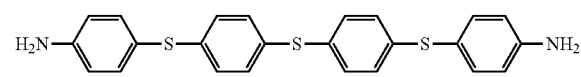

(2)

First, the diamine compound expressed by the chemical formula (2) was produced.

In particular, dithio phenylene sulfide and p-chloronitrobenzene were mixed to N,N-dimethylacetamide as a reaction solvent at an equivalent ratio of SH group and Cl group are 1:1.1 (SH:Cl). Thereafter, the reaction solvent was heated to 60 degrees Celsius (° C.), and then potassium carbonate was added to the reaction solvent at an equivalent ratio of SH group of the dithio phenylene sulfide and the potassium carbonate is 1:1.1 (SH:potassium carbonate).

Thereafter, the reaction solvent was heated at 120° C. for 5 hours to carry our a reaction. Thereafter, the reaction solvent was put into an ion exchange water to carry our redeposition, and a solid material was obtained by filtration of the reaction solvent. Thereafter, the solid material was washed with heat ethanol, and then dried. As a result, a phenylene sulfide oligomer (n=3) that has a nitro group at both the ends was obtained. The yield of the phenylene sulfide oligomer was 80%.

Thereafter, the phenylene sulfide oligomer that has the nitro group at both the end and palladium carbon were added to isopropyl alcohol as a reaction solvent. The blending ratio (mass ratio) of the phenylene sulfide oligomer and the palladium carbon was 1:0.05 (phenylene sulfide oligomer:palladium carbon).

Thereafter, the reaction solvent was heated to 70° C., and then hydrated hydrazine was added to the reaction solvent while taking 1 hour. The additive amount of the hydrated hydrazine was adjusted so that the equivalent ratio of the nitro group of the phenylene sulfide oligomer and the hydrated hydrazine is 1:4 (nitro group:hydrated hydrazine). Thereafter, the reaction solvent was reacted by heating at 80° C. for 5 hours, so the nitro group at the ends of the phenylene sulfide oligomer was reduced into an amino group. Thereafter, the palladium carbon was removed from the reaction solvent by hot filtration, and then the reaction solvent was cooled to deposit a solid material.

Thereafter, the solid material was obtained by filtration, and then was dried. As a result, a phenylene sulfide oligomer (n=3) having the amino group at both the ends, that is, the diamine compound expressed by the chemical formula (2) was obtained. The yield of the diamine compound was 75%. Further, the structure of the diamine compound obtained was checked by a nuclear-magnetic-resonance (NMR) measurement. For a reference, a NMR spectrum of the phenylene sulfide oligomer (n=3) expressed by the chemical formula (2) is shown in FIG. 1. This diamine compound is referred to as a resin additive A. Although not illustrated, the purity of the diamine compound obtained was checked by a high performance liquid chromatography (HPLC).

Next, a PPS resin composition was produced by using the resin additive A produced as described above.

In particular, as a PPS resin, FORTRON 6165A6, which is made by POLYPLASTICS CO., LTD and is a widely used (standard) grade, was prepared. This PPS resin is referred to as a PPS resin A. Next, pellet of the PPS resin A and the resin additive A were beforehand dry-mixed at the blending ratio shown in a table 1. Thereafter, this mixture was mixed by a double wheels mixer, and then made into pellet again. In this way, the PPS resin composition of the example 1 was produced. In the table 1, the additive amount of the resin additive is the amount with respect to 100 parts by mass of the total of the PPS resin and the resin additive.

Next, a molded product (specimen) for evaluation was produced by molding the PPS resin composition.

The molding was conducted by an injection molding under the following conditions:

Resin temperature: 310° C.
Mold temperature: 150° C.

By this injection molding, a plate-shaped specimen with a size of 10 mm×80 mm×4 mm (width×length×thickness) was produced.

Next, an adhesive property of the specimen with a member to be adhered was evaluated. The member to be adhered is referred to as the adhering member, and is made of the PPS resin. The evaluation was performed by measuring a shear bond strength based on JIS K 6850 (1999).

In particular, the specimen produced as described above and the adhering member, which has a plate shape with a size of 20 mm×100 mm×4 mm (width×length×thickness) and is made of the PPS resin were, layered to overlap each other with a width of 5 mm, that is, in an area of 5 mm in a direction along the length. Thereafter, the overlapped portion between the specimen and the adhering member was bonded with an adhesive material. As the adhesive material, a two-liquid mixed type adhesive material made of a base resin and a hardening agent was used. As the base resin, DER331J made by Dow Chemical Company Japan was used. As the hardening agent, Aradur 9664-1 made by Huntsman Japan LLC. was used. In this way, a sample for the share test was produced by bonding the specimen and the adhering member. In the sample for the share test, the specimen and the adhering member were pulled in opposite directions along the length under the following conditions:

Temperature: Room Temperature (25° C.)
Speed: 5 mm/min

The strength (share bond strength) when the bonded portion is broken and the specimen and the adhering member are separated was measured. The result is shown in the table 1. The adhesive property was evaluated at four levels, such as "+2", "+1", "0" and "−1". In particular, "+2" represents a result where the bonding strength is 7 MPa or more, "+1" represents a result where the bonding strength is 5 MPa or more and less than 7 MPa. "0" represents a result where the bonding strength was 3 MPa or more and less than 5 MPa, and "−1" represents a result where the bonding strength is less than 3 MPa.

Also, a bending property of the specimen was evaluated. The bending property was measured by a three-point bending test based on JIS K 7171 (2008). The measurement of the bending property was performed under the following conditions:

Distance between supporting points: 64 mm
Test rate: 2 mm/min
Measurement temperature: Room temperature (25° C.)

The strength (fracture strength) until the specimen is broken by the three-point bending test was measured. The measurement result of the bending test is shown in the table 1. In the evaluation of the bending property, "+2" represents a result where the fracture strength 200 MPa or more, "+1" represents a result where the fracture strength is 180 MPa or more and less than 200 MPa, "0" represents a result where the fracture strength is 170 MPa or more and less than 180 MPa, and "−1" represents a result where the fracture strength is less than 170 MPa.

Examples 2 to 4 and Comparative examples 1 and 2

As examples 2 to 4 and comparative examples 1 and 2, PPS resin compositions were prepared by modifying types and/or amount of the resin additive, and/or types of the PPS resin from the example 1.

The PPS resin compositions of the examples 2 and 3 were produced in a similar manner to the example 1, except that the blending ratio of the PPS resin A and the resin additive A is different from that of the example 1 as shown in the table 1.

The PPS resin composition of the example 4 was produced in a similar manner to the example 1 except for using a diamine compound expressed by the following chemical formula (3). As the diamine compound expressed by the chemical formula (3), ASD made by Wakayama Seika Kogyo Co., Ltd. was used. The diamine compound expressed by the chemical formula (3) is hereinafter referred to as a resin additive B.

[Chemical Formula 3]

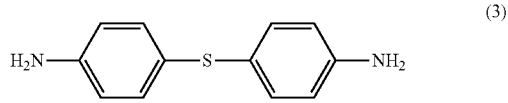

(3)

The PPS resin composition of the comparative example 1 was produced in a similar manner to the example 1, except that the resin additive was not used.

The PPS resin composition of the comparative example 2 was produced in a similar manner to the example 1, except that an adhering grade, FORTRON 6565A6 made by POLYPLASTICS CO., LTD was used as the PPS resin, without using the resin additive. This PPS resin is hereinafter referred to as a PPS resin B.

The composition of the PPS resin composition of each of the examples 2 to 4 and each of the comparative examples 1 and 2 is shown in the table 1. In the table 1, the additive amount of the resin additive is defined with respect to 100 parts by mass of the total of the PPS resin and the resin additive. In the examples 1 and 2, the amount of the PPS resin A and the amount of the PPS resin B are 100 parts by mass, and the resin additive is 0 parts by mass.

Further, a molded product of the PPS resin composition of each of the examples 2 to 4 and each of the comparative examples 1 and 2 was produced in the similar manner to that of the example 1. Moreover, the adhesive property and the bending property of each molded product were evaluated. The results are shown in the table 1.

mula (1) is added to the PPS resin has excellent bending property, and the adhesive property thereof improves, as compared to that of the comparative example. The PPS resin compositions of these examples have excellent adhesive property, as compared with the PPS resin composition of the comparative example 2. In order to have the adhesive property as well as the bending property at high levels, the additive amount of the resin additive is preferably 0.1 to 10 parts by mass with respect to 100 parts by mass of the total of the resin additive and the PPS resin, more preferably 0.5 to 8 parts by mass, and further more preferably 1 to 5 parts by mass. As the diamine compound expressed by the general chemical formula (1), it is preferable to at least use a diamine compound with the natural number n of 3 (n=3).

Example 5

Next, an example of an electronic device that employs the molded product provided by molding the PPS resin composition of the example 1 will be described.

Figure 2:
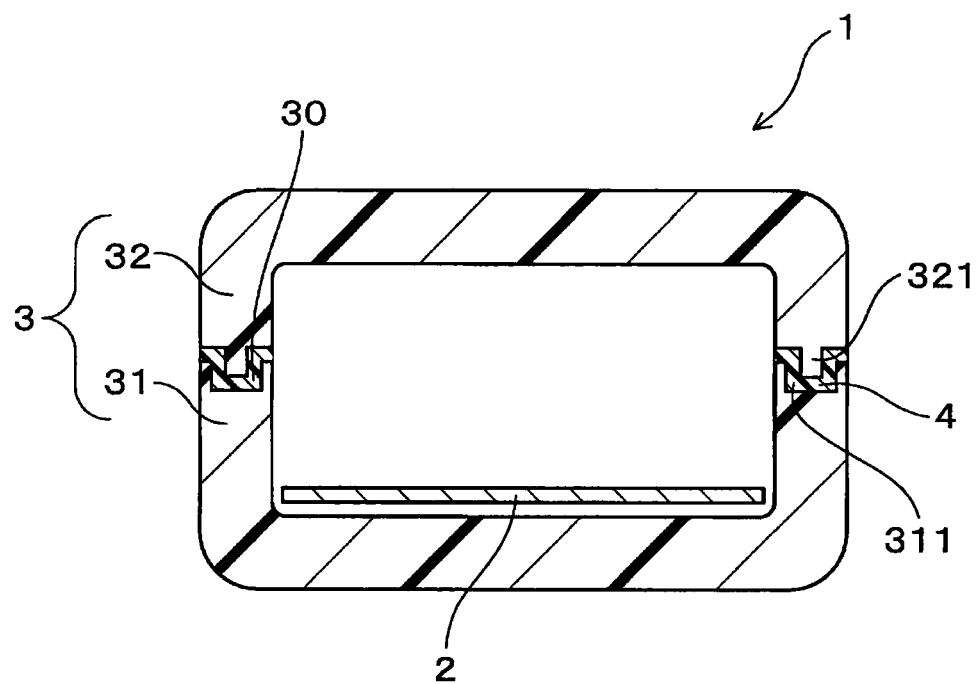
FIG. 2 is a diagram illustrating a cross-sectional view of an electronic device of an example 5.

As shown in FIG. 2, an electronic device 1 of the example 5 is, for example, a pressure sensor. The electronic device 1 includes an electronic substrate 2 as an electronic component, and a housing 3 accommodating the electronic substrate 2 therein. The housing 3 includes a body 31 and a cover 32. The body 31 has a box shape for accommodating the electronic substrate 2 therein. The cover 32 tightly seals an opening of the body 31. The body 31 and the cover 32 are engaged with each other at an engagement portion 30. The body 31 is formed with a recess 311 along its edge defining the opening. On the other hand, the cover 32 is formed with a projection 321 to engage with the recess 311 of the body 31. The engagement portion 30 is provided by the engagement of the projection 321 and the recess 311.

In the engagement portion 30, an adhesive material 4 is deposited. The body 31 and the cover 32 are bonded to each other with the adhesive material 4.

In the example 5, the housing 3, that is, the body 31 and the cover 32 are provided by molded products made of the polyphenylene sulfide resin composition of the example 1. That is, the body 31 and the cover 32 are provided by injection-molding the polyphenylene sulfide composition of the example 1. As the adhesive material 4, a two-liquid mixed type epoxy adhesive material was used. For example, the epoxy adhesive contains DER331J made by Daw Chemical Company Japan, as the base resin, and Aradur 9664-1 made by Huntsman Japan LLC, as the hardening agent.

TABLE 1

| | | Ex 1 | Ex 2 | Ex 3 | Ex 4 | Comp Ex 1 | Comp Ex 2 |
|---|---|---|---|---|---|---|---|
| PPS resin | | PPS resin A | PPS resin A | PPS resin A | PPS resin A | PPS resin A | PPS resin B |
| Resin Additive | Type | Additive A | Additive A | Additive A | Additive B | — | — |
| | Amount (pts · ms) | 1 | 5 | 8 | 1 | — | — |
| Adhesive Property | Bonding Strength (MPa) | 5.3 | 7.2 | 8.8 | 5.5 | 2.6 | 4.4 |
| | Determ. | +1 | +2 | +2 | +1 | −1 | 0 |
| Bending Property | Fracture strength (MPa) | 205 | 185 | 172 | 198 | 210 | 165 |
| | Determ. | +2 | +1 | 0 | +1 | +2 | −1 |

As shown in the table 1, the PPS resin compositions of the examples in which the diamine compound expressed by the chemical formula (2) or the chemical formula (3), that is, the diamine compound expressed by the general chemical for- In the electronic device 1 of the example 5, the housing 3 is provided by the molded product of the PPS resin composition of the example 1, which has excellent adhesive property, as shown in the table 1. Therefore, the body 31 and the cover 32 are bonded to each other with excellent bonding strength by the adhesive material 4. As such, the housing 3 can be hermetically sealed. Further, the PPS resin composition of the example 1 has the excellent bending property, as shown in the table 1. Therefore, in the electronic device 1 of the example 5, the housing 3 can exert the excellent bending property of the PPS resin. Further, the housing 3 has excellent shock resistance, and has improved reliability.

In the example 5, the electronic device 1 exemplary employs the housing provided by the molded product of the PPS resin composition of the example 1. The example 5 is an example. Namely, the PPS resin compositions of the examples 2 to 4 can be suitably used for the housing of the electronic device. Also in such cases, the housing can exert excellent adhesive property and excellent shock resistance by utilizing the excellent characteristics of the PPS resin compositions, as shown in the table 1. Further, the use of the PPS resin composition of the examples 1 to 4 is not limited to the housing of the electronic device.

While only the selected exemplary embodiment and examples have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiment and examples according to the present disclosure is provided for illustration only, and not for the purpose of limiting the disclosure as defined by the appended claims and their equivalents.

What is claimed is:

1. A resin additive for a polyphenylene sulfide, comprising:
a diamine compound expressed by a following general chemical formula (1):

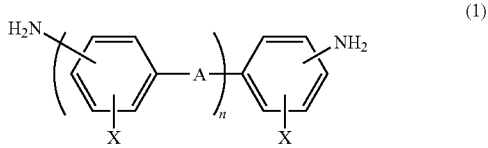

(1)

wherein, in the general chemical formula (1),
A is an oxygen atom or a sulfur atom,
X is a hydrogen atom, an alkyl group with a carbon number of six or less, or an aryl group, and
n is a natural number of 1 to 10.

2. The resin additive according to claim 1, wherein
in the general chemical formula (1), benzene skeletons are connected to each other at a meta position or a para position through the A.

3. The resin additive according to claim 1, wherein in the general chemical formula (1), the X is the hydrogen atom.

4. The resin additive according to claim 1, wherein in the general chemical formula (1), the A is the sulfur atom.

5. The resin additive according to claim 1, wherein n is a natural number of 1 to 5.

6. The resin additive according to claim 1, wherein n is a natural number of 1 to 9.

7. The resin additive according to claim 1, wherein X is an alkyl group with the carbon number of six or less or an aryl group.

8. The resin additive according to claim 1, wherein X does not include OH.

9. The resin additive according to claim 8, wherein X does not include $NH_2$.

10. The resin additive according to claim 1, wherein $NH_2$ is located at a first end of the resin additive.

11. The resin additive according to claim 10, wherein $NH_2$ is located at a second end of the resin additive.

12. A polyphenylene sulfide resin composition comprising:
the resin additive according to claim 1; and
a polyphenylene sulfide resin.

13. The polyphenylene sulfide resin composition according to claim 12, wherein
the content of the resin additive is 0.1 to 10 parts by mass with respect to 100parts by mass of a total of the resin additive and the polyphenylene sulfide resin.

14. An electronic device comprising:
a molded product of the polyphenylene sulfide resin composition according to claim 12.

15. The electronic device according to claim 14, further comprising:
an electronic component; and
an adhesive material, wherein
the molded product is a housing,
the electronic component is disposed in the housing, and
the housing is adhered with the adhesive material.

16. The electronic device according to claim 15, wherein the adhesive material is an epoxy-based adhesive material.

\* \* \* \* \*